United States Patent [19]

Narusawa et al.

[11] Patent Number: 5,151,831
[45] Date of Patent: Sep. 29, 1992

[54] DIGITAL SIGNAL PROCESSING CIRCUIT

[75] Inventors: Hitoshi Narusawa; Michiaki Yoneda, both of Tokyo, Japan

[73] Assignee: Nakamichi Corporation, Kodaira, Japan

[21] Appl. No.: 513,236

[22] Filed: Apr. 23, 1990

[30] Foreign Application Priority Data

Apr. 28, 1989 [JP] Japan .................................. 1-110344

[51] Int. Cl.$^5$ .............................................. G11B 5/09
[52] U.S. Cl. ...................................................... 360/39
[58] Field of Search .......................................... 360/39

[56] References Cited

U.S. PATENT DOCUMENTS 4,791,495 12/1988 Umemoto et al. ..................... 360/39
4,963,992 10/1990 Doi et al. ............................... 360/39

Primary Examiner—David J. Severin
Attorney, Agent, or Firm—Pearne, Gordon, McCoy & Granger

[57] ABSTRACT

A digital signal processing circuit comprising two memory groups to sequentially store digital data of transmission rate t input by a frame unit, a first controller to control the memory groups so that one of the memory groups simultaneously reads out the stored digital data at transmission rate t/n while another memory group sequentially stores the digital data, a signal processor to sequentially signal-process digital data of n systems alternately output from the two memory groups on DAT format, respectively; two other memory groups to alternately store the data signal-processed by the signal processing means, respectively, and a second controller to control the two other memory groups so that one of the two other memory groups outputs the stored and signal-processed digital data at a velocity n times as great as that on memory in a predetermined sequential manner while the other memory groups store the signal-processed data output from the signal processor.

4 Claims, 6 Drawing Sheets

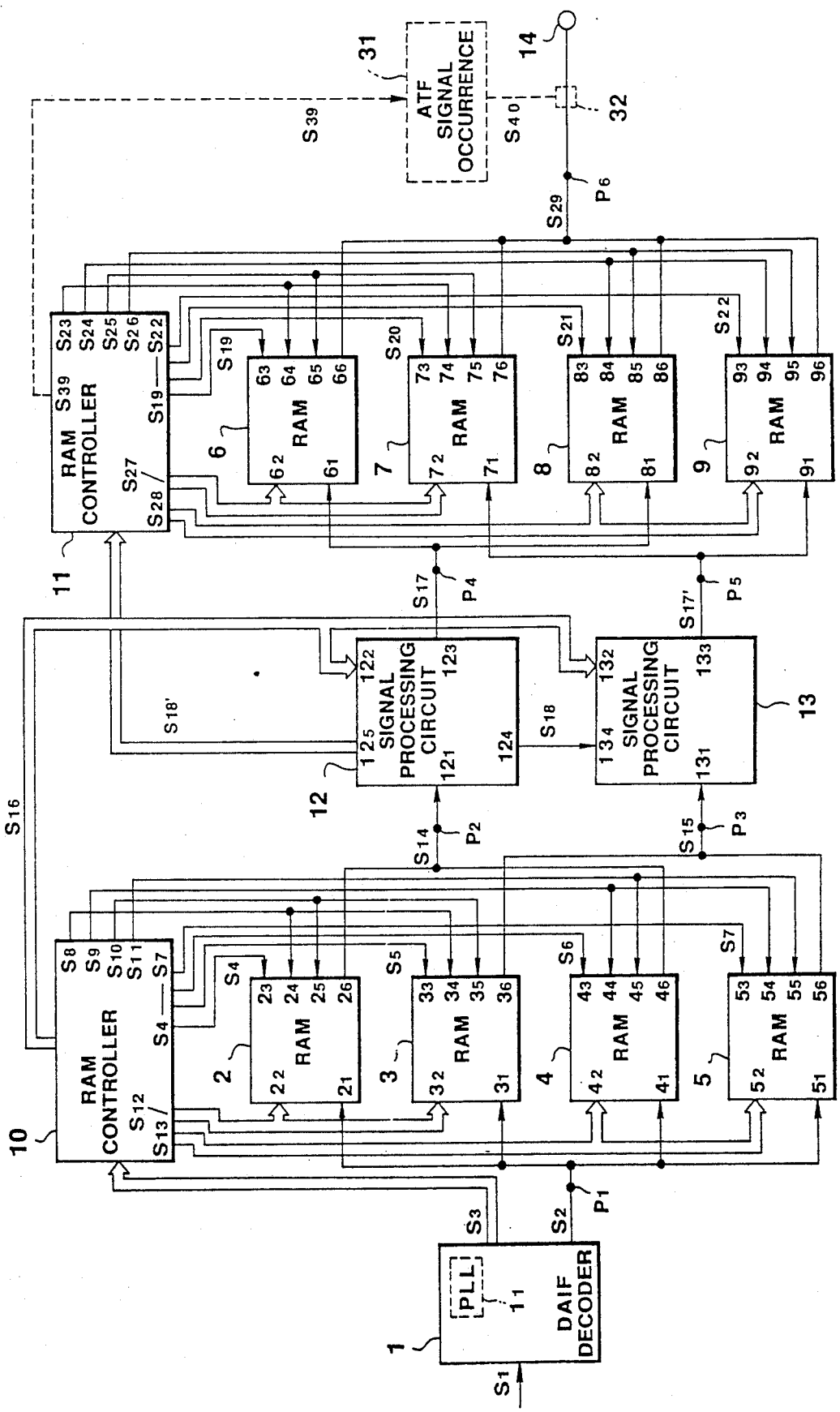

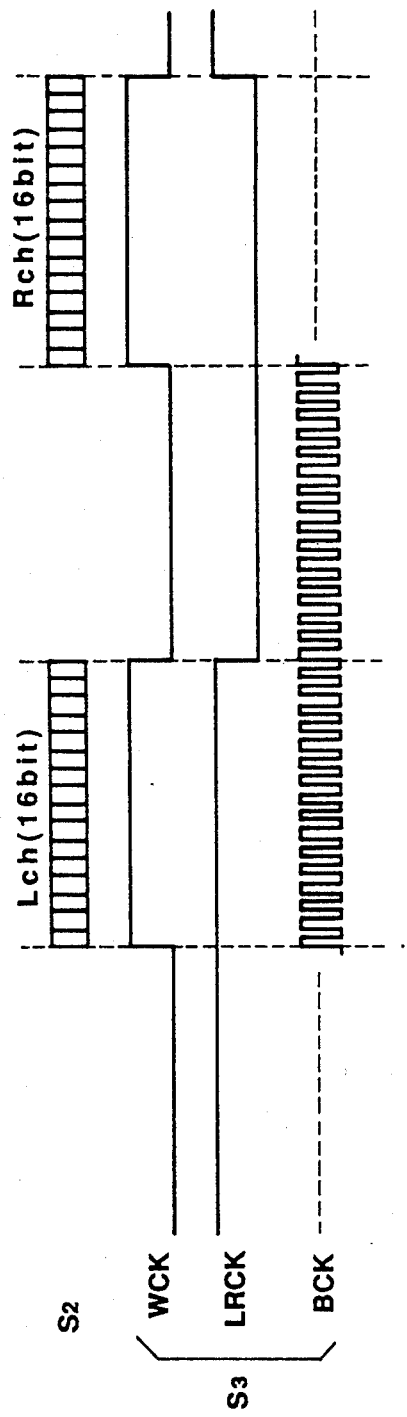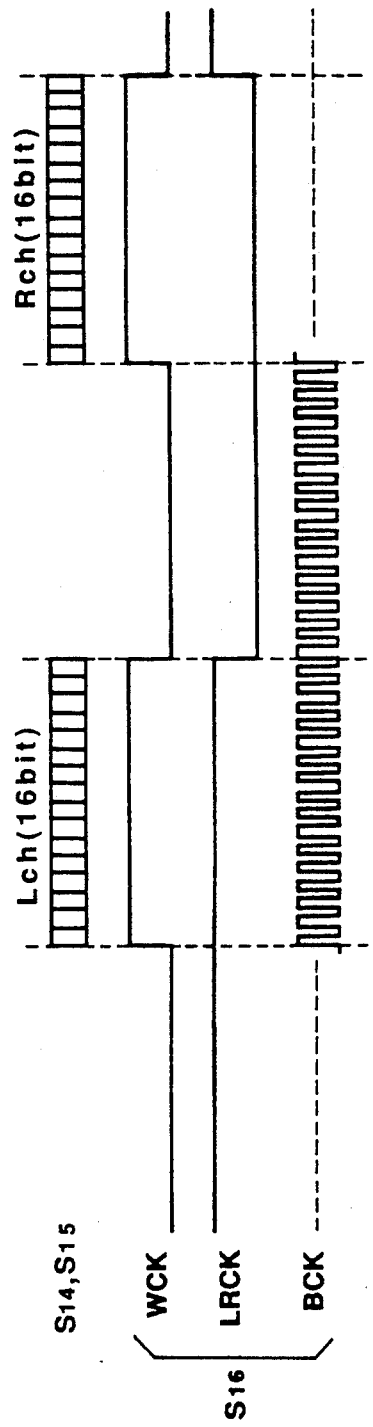

DIGITAL SIGNAL PROCESSING CIRCUIT

BACKGROUND OF THE INVENTION

A digital signal processing circuit is suitably used for recording and reproducing a digital signal at high velocity in a digital signal recording and reproducing apparatus such as a digital audio tape recorder (DAT).

A general description of a digital signal flow when recording it in a conventional DAT will be made with reference to FIG. 6. A digital audio interface format decoder (DAIF decoder) 51 serves to decode a digital audio interface format signal (DAIF decoder) $s_{51}$ fed based on digital audio interface format (DAIF). Digital data (D data) $S_{52}$ formed by being digitized at a sampling frequency Fs included in the DAIF signal $S_{51}$ and at quantization bit number n bits is output to a signal processing circuit 52 at predetermined timing synchronizing with the generation clock. The decoder 51 may include a PLL circuit (phase locked loop circuit) $51_1$ which accompanies a generation clock of frequencies 128 Fs synchronizing with a self clock of the DAIF signal $S_{51}$. The PLL circuit $51_1$ supplies a control clock group $S_{53}$, formed by dividing the generation clock, to the signal processing circuit 52. The control clock group $S_{53}$ includes a system clock of 128 Fs necessary for signal processing, a Left-Right clock (LRCK) of frequency Fs indicating a channel of the D data $s_{52}$ being output, a word clock (WCK) of frequency 2Fs indicating an output timing and a bit clock (BCK) of the data $S_{52}$ of frequency 64Fs.

The signal processing circuit 52 sequentially signal-processes the D data $S_{52}$ at a timing synchronizing with the input control clock group $S_{52}$.

Signal-processing by the signal processing circuit 52 together with a RAM (random access memory) 53 includes interleaving, adding an error correcting code, 8-10 modulating and generating an ATF (Automatic Track Following) signal. Although the detailed description of such signal-processing will be omitted, an RF-REC signal $s_{55}$ output from the signal processing circuit 52 is made a signal based on a track format of the DAT. A head amplifier 55 sequentially and selectively supplies current signals based on the RF-REC signal $S_{55}$ to plus-azimuth and minus-azimuth heads A and B, respectively which are disposed in a manner faced to a periphery of a rotary drum 56.

It Will be noted that a DAT tape 57 is wound on the rotary drum 56 while a winding angle of 90 degrees is maintained.

Furthermore, the signal processing circuit 52 supplies a reference pulse signal $S_{54}$ for PLL-controlling the rotary drum 56 to a servo circuit 54. The servo circuit 54 receives the reference pulse signal $S_{54}$ and a rotation signal $S_{57}$ generated in synchronization with a rotation of the rotary drum 56 to control a drive motor $56_1$ for the rotary drum 56 at predetermined rotation frequency fd so that the phases synchronize with each other. A rotation signal $S_{56}$ for a capstan motor 60 for driving a capstan 59 which serves to transfer a tape 57 together with a pressure roller 58 is monitored and the capstan motor 60 is PLL-controlled at a predetermined tape transfer velocity so as to synchronize with the reference pulse signal $S_{54}$.

Also, the signal processing circuit 52 receives the rotation signal $S_{57}$ for the rotary drum 56 and intermittently supplies the RF-REC signal $S_{55}$ corresponding to two tracks while the rotary drum 56 rotates by one revolution at timing synchronizing with the rotation signal $S_{57}$. Thus, it will be noted that recording patterns of two tracks are formed by the respective heads A and B on the tape 57 at its predetermined position.

At a standard mode time of the DAT, the transmission rate of the D data of the DAIF signal $S_{51}$ is 192 kbites/second, the rotation frequency fd of the rotary drum 56 is 2000 r.p.m. and the tape transfer velocity Vp is 8.15 mm/second.

In such a DAT construction, it will be possible for doubling a recording velocity so that the transmission rate of the D data becomes 384 kbites/second which is twice as much as that of the standard mode time while the velocities at which all the processes by the signal processing circuit 52 is made are doubled, and that the rotation frequency fd of the rotary drum 56 and the tape transfer velocity Vp are doubled, respectively.

However, the signal processing circuit 52 is required to make enormous signal processes and as a result it is substantially impossible that the process velocity of the signal processing circuit is so set as to be doubled. This prevents the digital recording and reproducing apparatus from dubbing at higher velocity.

SUMMARY OF THE INVENTION

Accordingly, it is a principal object of the invention to provide a digital signal processing circuit adapted to signal-process a D data at transmission rate twice as much as that of standard mode time without changing a process velocity thereof.

It is another object of the invention to provide a digital signal processing circuit suitably used for dubbing of a digital recording and reproducing apparatus at higher velocity.

It is a further object of the invention to provide a signal processing circuit obtained in an inexpensive manner by its having a simplified construction.

In accordance with the present invention, there is provided a digital signal processing circuit comprising:

first and second memory groups each including first through $n_{th}$ memory means to sequentially store digital data of transmission rate t input by a frame unit;

first control means to control said first and second memory groups so that said first through $n_{th}$ memory means in one of said first and second memory groups simultaneously outputs said stored digital data at transmission rate t/n while said first through $n_{th}$ memory means in the other of said first and second memory groups sequentially stores said digital data;

first through $n_{th}$ signal processing means to sequentially signal-process digital data of n systems alternately output from said first and second memory groups on a format of DAT, respectively;

third and fourth memory groups each including first through $n_{th}$ memory means to alternately store said data signal-processed by said signal processing means, respectively;

and second control means to control said third and fourth memory groups so that said first through $n_{th}$ memory means in one of said third and fourth memory groups outputs said stored signal-processed digital data at a velocity n times as much as that on memory in a predetermined sequential manner while said first through $n_{th}$ memory means in the other of said third and fourth memory groups stores said signal-processed data output from said first through $n_{th}$ signal processing means.

BRIEF DESCRIPTION OF THE DRAWINGS

The above and other objects and features of the invention will be apparent from the description of the embodiments of the invention with reference to the accompanying drawings in which:

FIG. 1 is a block diagram of a digital signal processing circuit constructed in accordance with one embodiment of the invention;

FIGS. 2A and 2B are time charts used for description of the blocks, of FIG. 1;

DETAILED DESCRIPTION OF THE EMBODIMENTS

Figure 3:
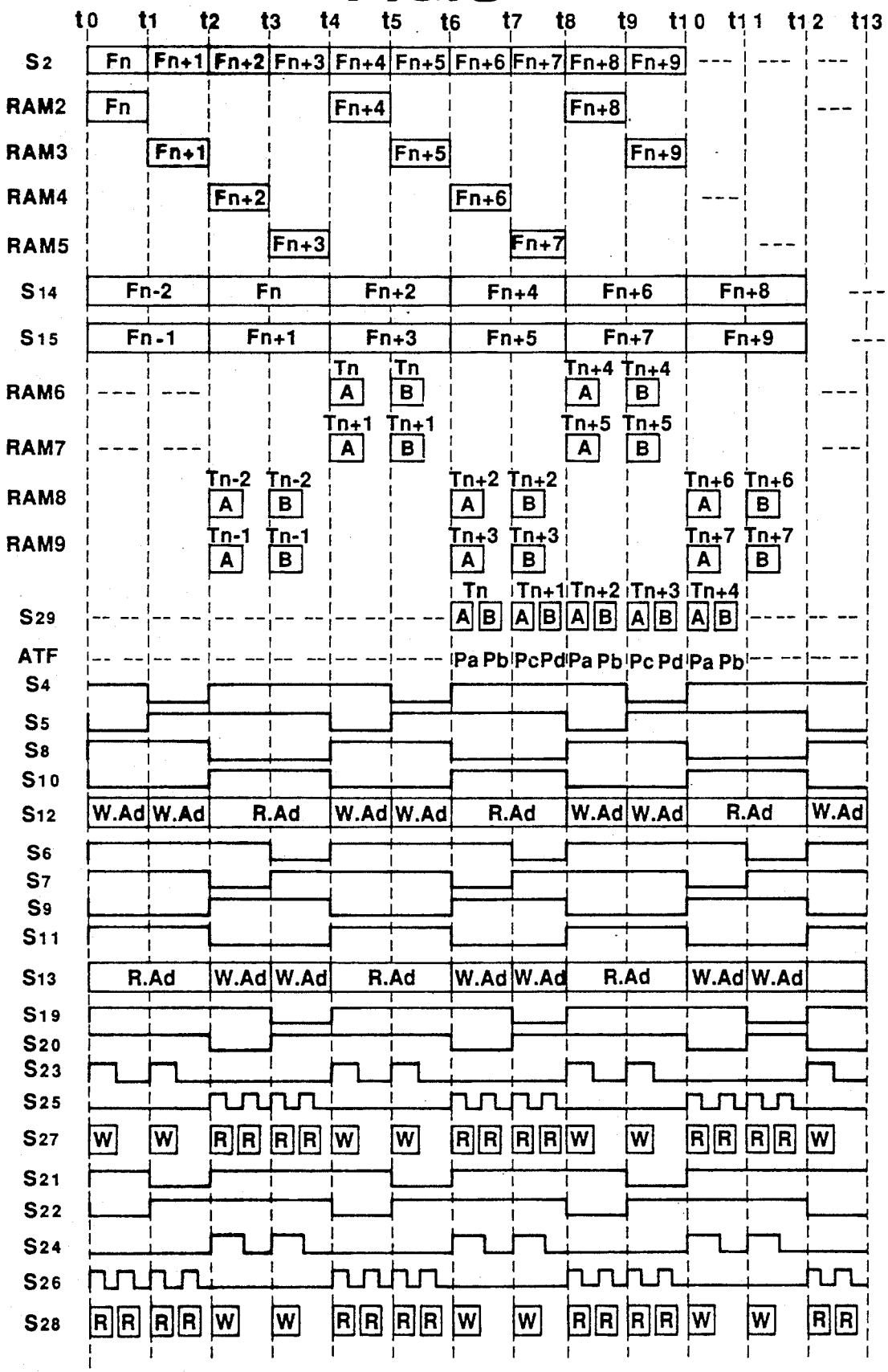
FIG. 3 is another time chart used for description of the blocks of FIG. 1.

Referring now to FIG. 1, there is illustrated a digital signal processing circuit constructed in accordance with one embodiment of the invention. The digital signal processing circuit comprises a DAIF decoder 1 serving to decode a DAIF signal $S_1$. The DAIF decoder 1 includes a PLL circuit $1_1$ which generates a generation clock in synchronization with a self clock of the DAIF signal $S_1$. The PLL circuit $1_1$ supplies digital data (D) $s_2$ formed by being digitized at a sampling frequency Fs included in the DAIF signal $S_1$ and at quantization bit number n bits to respective data input terminals $2_1$ through $5_1$ of RAMs 2 through 5 and also supplies a generation clock signal group $S_3$ to a RAM controller 10.

FIG. 2A illustrates a relation between the D data $S_2$ and the generation clock signal group $S_3$. As noted from FIG. 2A, the D data $S_2$ is formed of sampling data of n bits for L (Left) and R (Right) channels alternately disposed having a predetermined space. A WCK among the generation clock signal group $S_3$ is High while respective sampling data are output. A LRCK indicates a channel to which the sampling data belongs and conditions High and Low correspond to the L and R channels, respectively. A BCK has a period of minimum inversion time of the D data $S_2$.

Suppose that the sampling frequency of the D data $S_2$ is Fs, the bit number of the quantization is 16, the number of channel is 2 and the transmission rate is 192 kbites/second, the frequencies of the WCK, the LRCK and the BCK of the generation clock signal group $S_3$ are 2Fs, Fs and 64Fs, respectively.

It is necessary for a transmission rate of the D data $S_2$ to be made 384 kbites/second which is twice as much as a standard transmission rate for making a dubbing at twofold velocity by a DAT. Since the digital signal processing circuit of FIG. 1 is constructed in accordance with such DAT, the frequencies of the WCK, the LRCK and the BCK of the generation clock signal groups $s_3$ from the DAIF decoder 1 are 4Fs, 2Fs and 128 Fs, respectively.

A RAM controller 10 receives the generation clock signal group $s_3$ and supplies to the four RAMs 2, 3, 4 and 5 chip selecting signals (CS signal) $S_4$ through $S_7$, writing signals (WE signal) $S_8$ and $S_9$, reading signals (OE signal) $S_{10}$ and $S_{11}$ and address designation signal groups (AD signal group) $S_{12}$ and $S_{13}$ for sequentially writing and outputting the D data signal $S_2$ at a timing described later.

Although the CS signals $S_4$ through $S_7$ among the output signals are supplied to CS signal input terminals $2_3$ through $5_3$ of the RAMs 2 through 5, the RAMs are operated only when the CS signals are High and absolutely stop being operated when the CS signals are Low.

The AD signal group $S_{12}$ is supplied to AD signal input terminals $2_2$ and $3_2$ of the RAMs 2 and 3, respectively while the AD signal group $S_{13}$ is supplied to AD signal input terminals $4_2$ and $5_2$ of the RAMs 4 and 5, respectively.

The WE signal $S_8$ is supplied to WE signal input terminals $2_4$ and $3_4$ of the RAMs 2 and 3, respectively while the WE signal $S_9$ is supplied to WE signal input terminals $4_4$ and $5_4$ of the RAMs 4 and 5, respectively. The RAMs 2 through 5 are at a state of writing when the input WE signals $S_8$ and $S_9$ are High to sequentially store the input D data $S_2$ to data input terminals $2_1$ through $5_1$ of the RAMs 2 through 5 at addresses designated by the AD signal groups.

The OE signal $S_{10}$ is supplied to OE signal input terminals $2_5$ and $3_5$ of the rams 2 and 3, respectively while the OE signal $S_{11}$ of the RAMs 4 and 5 is supplied to OE signal input terminals $4_5$ and $5_5$ of the RAMs 4 and 5, respectively. The RAMs 2 through 5 are at a state of outputting when the OE signals $S_{10}$ and $S_{11}$ are High to sequentially output the D data stored at the addresses designated by the AD signal groups. The RAMs 2 and 4 output the output data $S_{14}$ from data output terminals $2_6$ and $4_6$ thereof, respectively while the RAMs 3 and 5 output the output data $S_{15}$ from data output terminals $3_6$ and $5_6$ thereof, respectively.

The RAM controller 10 outputs a timing clock group (TCK group) $S_{16}$ necessary for signal-processing the output data $S_{14}$ and $S_{15}$ which are input to signal processing The TCK group $S_{16}$ has a relation of predetermined synchronization with the AD signal groups $S_{12}$ and $S_{13}$ for designating the addresses where the D data is output from the RAMs 2 through 5 and the timings at which the D data is output therefrom. As noted from FIG. 2B, the relation of the output data $S_{14}$ or $S_{15}$ to the TCK group $S_{16}$ is set in the same manner as the relation of the D data $S_2$ to the generation clock group $S_3$ as shown in FIG. 2A. More particularly, the TCK group $S_{16}$ comprises WCK, LRCK and BCK, which have a predetermined relation to the output data $S_{14}$ and $S_{15}$ as aforementioned. Since the transmission rate of the output data $S_{14}$ and $S_{15}$ are so set at 192 kbites/second, frequencies of the WCK, the LRCK and the BCK of the TCK group $S_{16}$ are 2Fs, Fs and 64Fs, respectively.

The signal processing circuits 12 and 13 serve to process the output data $S_{14}$ and $S_{15}$ input to input terminals $12_1$ and $13_1$ thereof based on the TCK group $S_{16}$ input to input terminals $12_2$ and $13_2$ thereof.

Signal-processing by the signal processing circuits 12 and 13 includes interleaving over one frame (corresponding to 2 tracks) according to a format of the DAT, adding an error correcting code, 8–10 modulating and generating an ATF signal. Although the detailed description of such signal-processing will be omitted, signal-processed data $S_{17}$ and $S_{17}'$ output from signal output terminals $12_3$ and $13_3$ of the signal processing circuits 12 and 13 are made signals based on a track format of the DAT.

A system synchronizing signal $S_{18}$ is output from an output terminal $12_4$ of the signal processing circuit 12 to an input terminal $13_4$ of the signal processing circuit 13 so that the two signal processing circuits 12 and 13 are operated in synchronization with each other. A memory timing clock group (MTCK group) $S_{18}'$ necessary for storing the signal-processed data $S_{17}$ and $S_{18}'$ on the RAMs 6 through 9 with a relation of distribution described later is output from a clock output terminal $12_5$ of the signal processing circuit 12 to a RAM controller 11.

The RAM controller 11 receives the MTCK group $S_{18}'$ and supplies to four RAMs 6, 7, 8 and 9 CS signals $S_{19}$ through $S_{22}$, WE signals $S_{23}$ and $S_{24}$, OE signals $S_{25}$ and $S_{26}$ and AD signal groups $S_{27}$ and $S_{28}$ for sequentially writing and outputting the signal-processed data $S_{17}$ and $S_{17}'$ at a timing described later. The CS signals $S_{19}$ through $S_{22}$ among the output signals are supplied to CS signal input terminals $6_3$ through $9_3$ of the RAMs 6 through 9. The AD signal group $S_{27}$ is supplied to AD signal input terminals $6_2$ and $7_2$ of the RAMs 6 and 7, respectively while the AD signal group $S_{28}$ is supplied to AD signal input terminals $8_2$ and $9_2$ of the RAMs 8 and 9, respectively. The WE signal $S_{23}$ is supplied to WE signal input terminals $6_4$ and $7_4$ of the RAMs 6 and 7, respectively while the WE signal $S_{24}$ is supplied to WE signal input terminals $8_4$ and $9_4$ of the RAMs 8 and 9, respectively. The OE signal $S_{25}$ is supplied to OE signal input terminals $6_5$ and $7_5$ of the rams 6 and 7, respectively while the OE signal $S_{26}$ of the RAMs 8 and 9 is supplied to OE signal input terminals $8_5$ and $9_5$ of the RAMs 8 and 9, respectively.

The RAMs 6 and 8 receive the signal-processed data $S_{17}$ to data input terminals $6_1$ and $8_1$ thereof, respectively, while the RAMs 7 and 9 receive the signal-processed data $S_{17}'$ to data input terminals $7_1$ and $9_1$ thereof, respectively. The RAMs 6 through 9 are so operated to write and output the signal-processed data based on the signals $S_{19}$ through $S_{27}$ input from the RAM controller 11 at a timing described later.

What the RAMs 6 through 9 do based on the signals $S_{19}$ through $S_{28}$ input from the RAM controller 11 is identical to what the RAMs do based on the signals $S_8$ through $S_{13}$ input from the RAM controller 10.

An RF-REC signal $S_{29}$ read out from the RAMs 6 through 9 at a timing described later and output from an output terminal portion 14 is output in a pattern based on a track format of the DAT in the same manner as the signal-processed data $S_{16}$ and $S_{17}$ and recorded on a magnetic tape by two heads A and B disposed in a manner faced to a periphery of a rotary drum after being converted into a current signal by a head amplifier not shown.

The sequential relation of signals will be described herein just below with reference to FIG. 3.

Referring now to FIG. 3, the D data $S_2$ has data row codes ------ Fn ------ attached, every data row corresponding to one frame which corresponds to 2 tracks and which corresponds to 1440 words, one of which corresponds to 8 bits.

There appears the data row Fn in the D data $S_2$ during a period from time $t_0$ to time $t_1$. At that time, only the RAM 2 inputting the CS signal $S_4$ and the WE signal $S_8$ is High at both of its CS signal input terminal and its WE signal input terminal so that the data row is possible to be written. Thus, the RAM 2 sequentially stores the data row Fn at the addresses designated by the AD signal group $S_{12}$. An address data group sequentially appearing on the AD signal group $S_{12}$ serves to designate writing addresses having a reference code of W.Ad (or W) attached thereto.

Similarly, respective data rows Fn+1, Fn+2 and Fn+3 appearing on the D data $S_2$ during a period from time $t_1$ to time $t_4$ are sequentially stored by the RAMs 3 through 5, respectively. While the data rows Fn+2 and Fn+3 are stored by the RAMs 4 and 5 during a period from time $t_2$ to time $t_4$, the RAMs 2 and 3 are High at both of their CS signal input terminals $2_3$ and $3_3$ and their OE signal input terminals $2_5$ and $3_5$ so as to be able to read out the data rows. Thus, the RAMs 2 and 3 output the stored data row Fn and Fn+1 from the addresses designated by the AD signal group $S_{12}$ to output them to the signal processing circuits 12 and 13, respectively. The address data group sequentially appearing on the AD signal group $S_{12}$ serves to designate the output addresses having reference codes of R.Ad (or R) attached thereto.

As noted from FIG. 3, time required for outputting an information of one data row from the respective RAMs is twice as much as that required for writing it, but this is why the transmission rate of the output data $S_{14}$ and $S_{15}$ is set to be 192 kbites/second while the transmission rate for the D data $S_2$ which is a writing signal is 384 kbites/second.

Accordingly, after the signal processing circuits 12 and 13 simultaneously signal-process the data rows Fn and Fn+1 input at the transmission rate of 192 kbites/second in the aforementioned manner during the period from time $t_2$ to time $t_4$, they sequentially output the signal-processed data $S_{17}$ and $S_{17}'$ at the same timing during a period from time $t_4$ to time $t_6$. Although the data rows output at that time correspond to Fn and Fn+1, they intermittently appear as track data rows TAn, TBn and TAn+1, TBn+1, respectively based on the track format of the DAT. The TA group is fed finally to the head A while the TB group is fed finally to the head B. It should be noted that in FIG. 3, the references A and B are surrounded by frames.

At that time, since both of the CS signals $S_{19}$ and $S_{20}$ applied to the CS signal input terminals $6_3$ and $7_3$ of the RAMs 6 and 7 and the WE signal $S_{23}$ applied to the WE signal input terminals $6_4$ and $7_4$ thereof are High so that the RAMs 6 and 7 are at a state of writing, the track data rows TAn, TBn and TAn+1, TBn+1 are stored by the RAMs 6 and 7, respectively in accordance with the AD signal group $S_{27}$ sequentially designating the addresses.

The signal processing circuits 12 and 13 output the signal-processed track data rows TAn, TBn and TAn+1, TBn+1, respectively during the period from time $t_4$ to time $t_6$ and at the same time, input the new data rows Fn+2 and Fn+3 from the RAMs 4 and 5, respectively at the transmission rate of 192 kbites/second. Therefore, both of the CS signals $S_6$ and $S_7$ input to the CS signal input terminals $4_3$ and $5_3$ of the RAMs 4 and 5, respectively and the OE signal $S_{11}$ input to the OE signal input terminals $4_5$ and $5_5$ thereof, respectively are High while the AD signal group $S_{13}$ is at a state of designating the output positions. The RAMs 2 and 3 store the new data rows Fn+4 and Fn+5 in accordance with 21 the aforementioned procedure during the period from time $t_4$ to time $t_6$.

Following this, both of the CS signal $S_{19}$ and the OE signal $S_{25}$ input to the RAM 6 are High during a period from time $t_6$ to time $t_7$, the RAM 6 outputs the track data rows TAn and TBn in accordance with the AD signal $S_{27}$ designating the output addresses at the transmission rate twice as much as that on writing and outputs them from the output terminal 14. The RAM 7 reads out the track data rows TAn+ and TBn+1 during a period from time $t_7$ to time $t_8$ and outputs them from the output terminal 14.

On the other hand, the signal processing circuits 12 and 13 input the data rows Fn+4 and Fn+5 from the RAMs 2 and 3 in accordance with the aforementioned procedure and at the same time signal-process them while the RAMs 4 and 5 store the new data rows Fn+6 and Fn+7 in accordance with the aforementioned procedure.

During a period from time $t_8$ to time $t_{10}$, the RAMs 8 and 9 output the track data rows TAn+2, TBn+2 and TAn+3, TBn+3, respectively at the transmission rate twice as much as that on writing in the same manner as the RAMs 6 and 7 and sequentially output them from the output terminal 14.

The track data rows of the RF-REC signal $S_{29}$ output from the output terminal 14 intermittently appear and this is why they are generated in synchronization with the timing at which the heads A and B disposed in a manner facing to the periphery of the rotary drum engage the magnetic tape wound on the rotary drum at a winding angle of 90 degrees. At that time, the rotation frequency of the rotary drum and the transfer velocity of the magnetic tape are so set to be twice as much as in a standard mode. Furthermore, the rotary drum should have a predetermined relation of synchronization with the timing at which the track data rows of the RF-REC signal $S_{29}$ are generated, but the detailed description thereof will be omitted.

Similarly, the RAMs 2 through 9 periodically write and output the data in accordance with the CS signals, the WE signals, the OE signals and AD signals input thereto while the signal processing circuits 12 and 13 repeatedly signal-process the output data input thereto.

As aforementioned, the respective track data rows - - - - - TAn, TBn, TAn+1, TBn+1 - - - - - of the signal-processed data $S_{17}$ and $S_{17}'$ output from the signal processing circuits 12 and 13 have a pattern formed in accordance with a track format of the DAT, and therefore, the track data rows have an automatic track following (ATF) signal added to their front end and their rear end thereof. The ATF signal has four patterns Pa, Pb, Pc and Pd formed in view of a track unit. The four patterns Pa, Pb, Pc and Pd should be written on the tape so that the respective patterns periodically appear every four tracks. In other words, as shown in FIG. 3, the respective track data rows - - - - - TAn, TBn, TAn+1, TBn+1, TAn+2 - - - - - of the RF-REC signal $S_{29}$ have the ATF signal patterns Pa, Pb and Pc, Pd added thereto, respectively.

Accordingly, the signal processing circuit 12 is so constructed that the ATF signal pattern for the TA group of the output track data row is Pa while the ATF signal pattern for the TB group is Pb. The signal processing circuit 13 is so constructed that the ATF signal pattern for the TA group of the output track data rows is Pc while the ATF signal pattern for the TB group is Pd.

Although, in the above embodiment, the RAMs are described to make a data writing process and an outputting process in a serial manner every one bit, they may make parallel processes every several bits. This may be accomplished by providing serial-to-parallel converter circuits at points $P_1$, $P_4$ and $P_5$ of the data path of FIG. 1 and by providing parallel-to-serial converter circuits at points $P_2$, $P_3$ and $P_6$ thereof.

As noted from the above description, the D data fed at the transmission rate twice as much as that of the standard mode can be processed in accordance with the format of the DAT without changing the speed at which the signal processing circuits 12 and 13 make signal-processing.

Although, in the illustrated embodiment, the D data is in the form of sampling data obtained by digitizing the analog signal with the predetermined sampling frequency and the predetermined quantization bit number, it is not limited thereto. It may be data recorded in an outer instrument such as a computer, for example. Furthermore, although the RAMs are of one chip type, they may be of a plurality of memories having a smaller capacity.

The RAMs 2 through 9 of FIG. 1 can be divided into four memory groups in accordance with the content of the respective operations.

A first memory group includes the RAMs 2 and 3 while a second memory group includes the RAMs 4 and 5. The RAMs of each of the first and second memory groups are so controlled as to output the stored digital data to the corresponding signal processing circuits 12 and 13 at the same time, respectively and the RAMs of one of the memory groups output the stored digital data while the RAMs of the other memory group sequentially store the new digital data.

A third memory group includes the RAMs 6 and 7 while a fourth memory group includes the RAMs 8 and 9. The RAMs of each of the third and fourth memory groups are so controlled as to store the stored digital data from the corresponding signal processing circuits 12 and 13 at the same time, respectively and the RAMs of one of the memory groups store the digital data while the RAMs of the other memory group sequentially output the stored digital data.

It will be understood that this invention is never confined to the aforementioned embodiment, and that three or more than three signal processing circuits may be used to process the D data of transmission rate three or more than three times as much as that of the standard mode.

Figure 4:
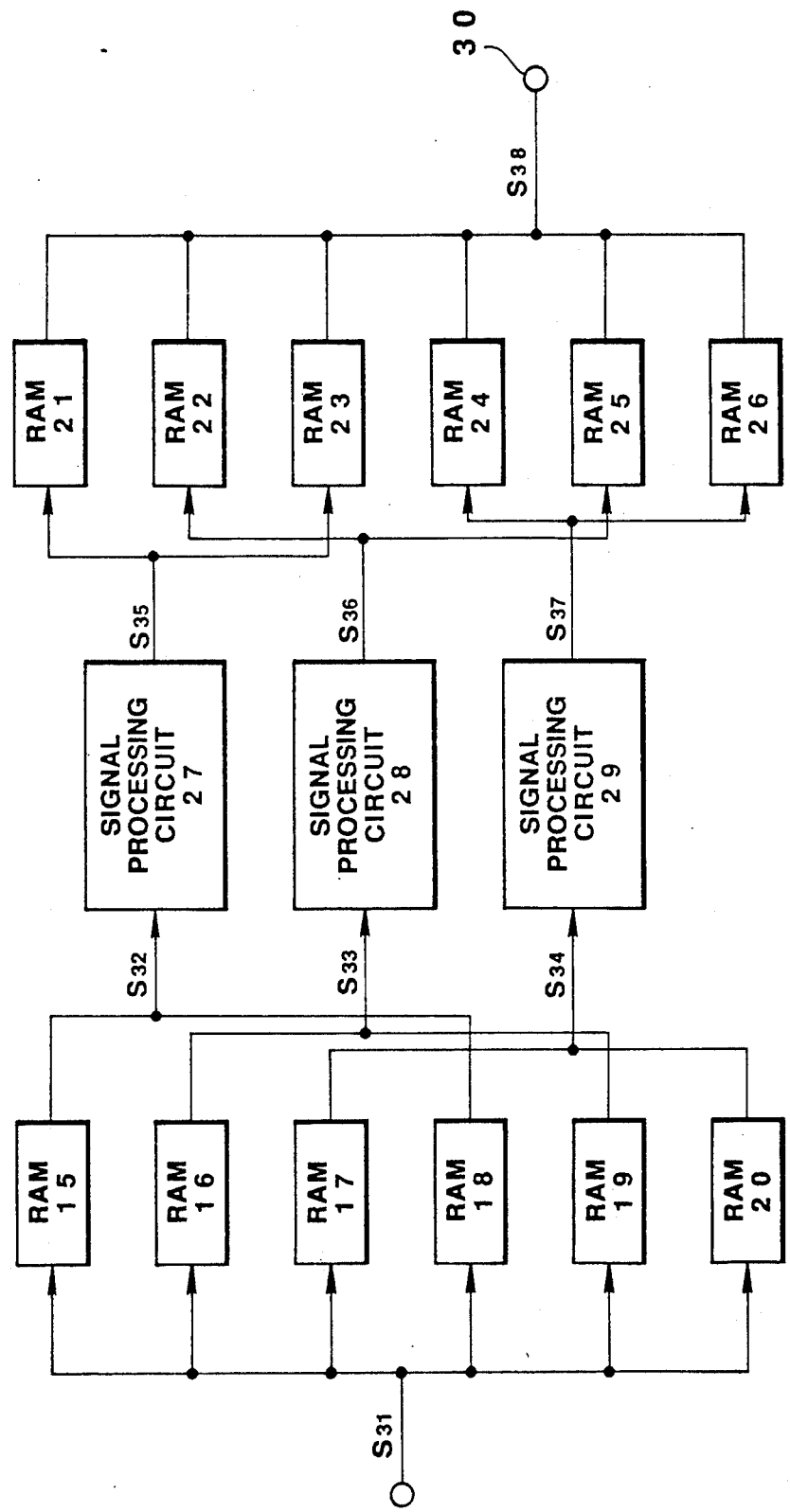
FIG. 4 is a block diagram of a digital signal processing circuit constructed in accordance with another embodiment of the invention.

FIG. 4 illustrates a digital signal processing circuit in which three signal processing circuits 27, 28 and 29 are used to process D data of a transmission rate three times as much as that of a standard mode.

For simple illustration, a relation of input and output of clock signals for operating RAM controllers, RAMs and the signal processing circuits is omitted. Only flow of the data stored will be described with reference to a time chart of FIG. 5.

A D data $S_{31}$ has a transmission rate of 576 kbites/second that is three times as much as that of standard mode and has data rows corresponding to one frame that is 2 tracks. This means that it has data row codes - - - - - Fn - - - - - every 1440 words, one of which corresponds to 8 bits.

Six RAMs 15 through 20 sequentially memorize these data rows and output them at predetermined timing to the signal processing circuits.

More particularly, the RAMs 15 through 17 sequentially store the data rows Fn, Fn+1 and Fn+2, respectively during a period from time $t_0$ to time $t_1$, and then simultaneously output at the transmission rate of 192 kbites/second the data rows Fn, Fn+1, and Fn+2, which are output to the signal processing circuits 27, 28 and 29, respectively while the RAMs 18 through 20 sequentially store the subsequent data rows $F_{n+3}$, $F_{n+4}$ and $F_{n+5}$, respectively during a period from time $t_1$ to time $t_2$. Similarly, the RAMs 18 through 20 simultaneously output at the transmission rate of 192 kbites/second the data rows $F_{n+3}$, $F_{n+4}$ and $F_{n+5}$, respectively, which are output to the signal processing circuits 27, 28, and 29.

Figure 5:
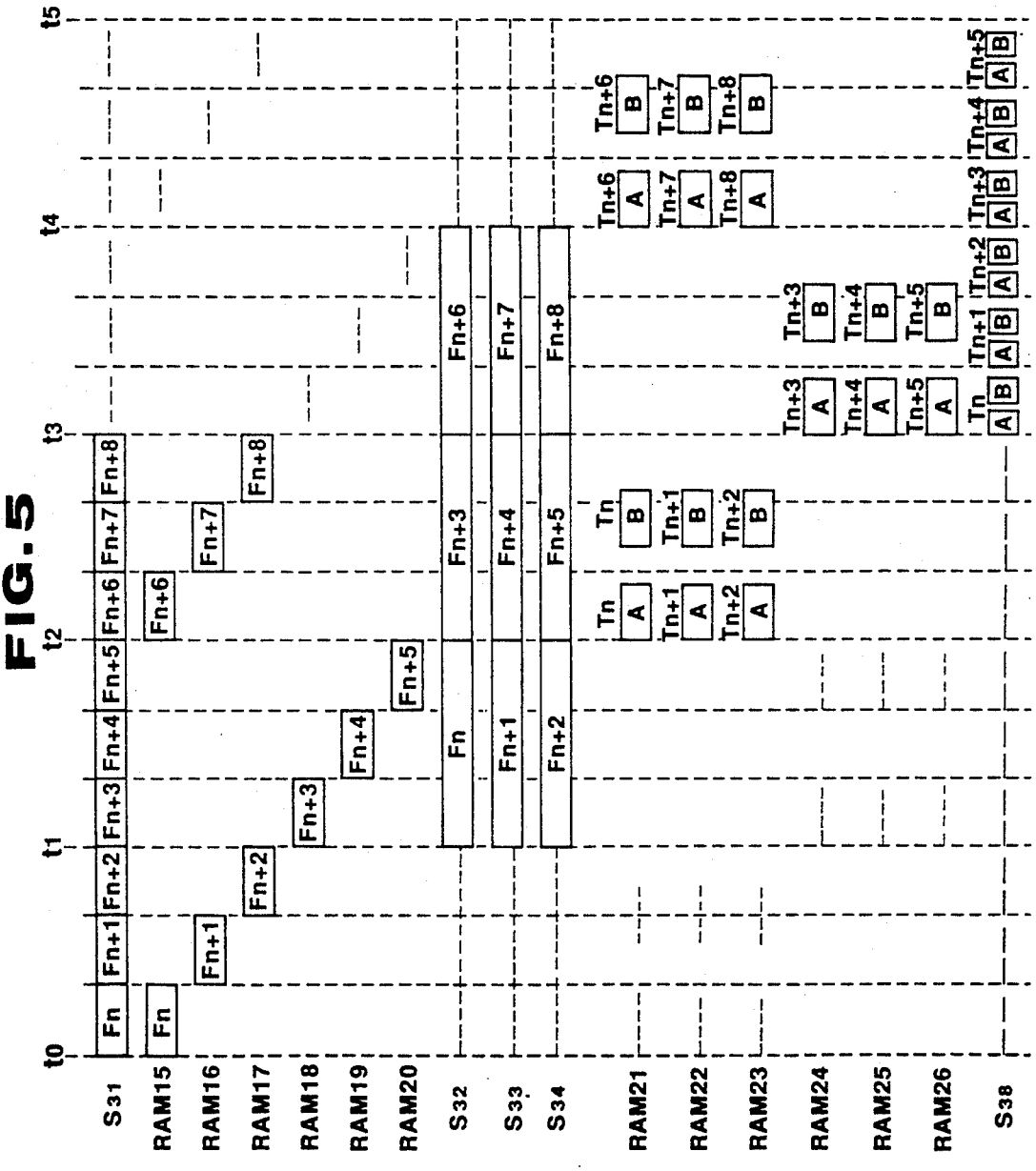
FIG. 5 is a time chart used for description of the blocks of FIG. 4.
Figure 6:
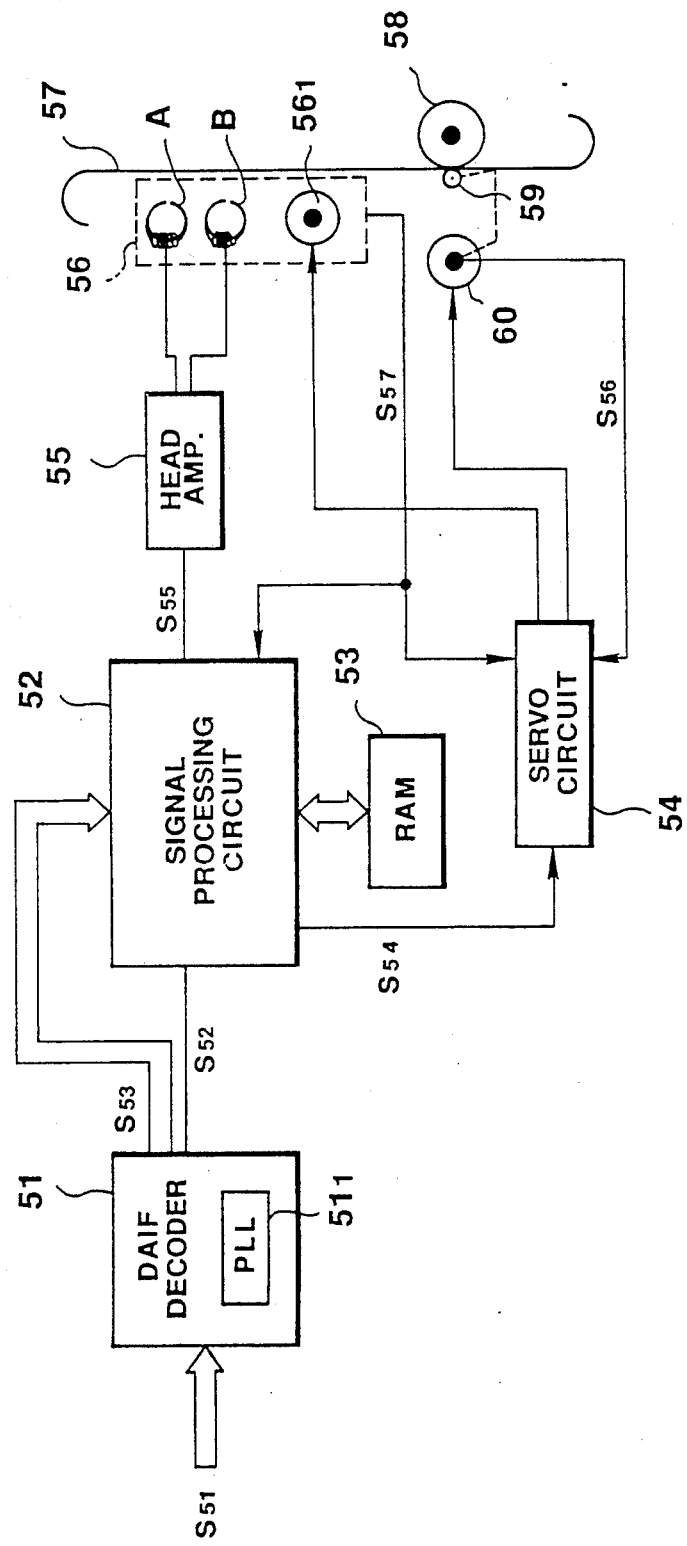
FIG. 6 is a block diagram of a prior art DAT constructed in a general manner.

Accordingly, the output data $S_{23}$, $S_{33}$ and $S_{34}$ input to the signal processing circuits 27, 28 and 29 comprise data rows of transmission rate of 192 kbites/second selected at intervals of three data rows and disposed parallel to each other as shown in FIG. 5.

The signal processing circuits 27, 28 and 29 signal-process the output data $S_{32}$, $S_{33}$ and $S_{34}$ input thereto at standard process velocity and output to RAMs 21 through 26 the signal-processed data $S_{35}$, $S_{36}$ and $S_{37}$ according to a track format of the DAT.

More particularly, the signal processing circuits 27, 28 and 29 input the data rows $F_n$, $F_{n+1}$ and $F_{n+2}$ input during the period from time $t_1$ to time $t_2$ and output them during the subsequent period from time $t_2$ to time $t_3$, but during which of the periods it signal-processes them is not clear. Thus, it is so treated that the track data rows output during the period from time $t_2$ to time $t_3$ already signal-processed. The RAMs 21, 22 and 23 among the RAMs 21 through 26 store these track data $TA_n$, $TB_n$, $TA_{n+1}$, $TB_{n+1}$, $TA_{n+2}$ and $TB_{n+2}$, respectively and sequentially output them to an output terminal portion 30 in a sequence shown in FIG. 5 at a velocity three times as much as that on writing during a period from time $t_3$ to time $t_4$, during which the RAMs 24, 25 and 26 store the track data rows $TA_{n+3}$, $TB_{n+3}$, $TA_{n+4}$, $TB_{n+4}$, $TA_{n+5}$ and $TB_{n+5}$, respectively which are output from the respective signal processing circuits 27, 28 and 29.

The components of FIG. 4 periodically repeat the aforementioned operation so that the D data fed at the transmission rate of 576 kbites/second which is three times as much as that of the standard mode can be processed based on the format of the DAT. It should be considered that the processing operation of the signal processing circuits is made so that the respective track data rows of the RF-REC signal $S_{38}$ output from the output terminal portion 30 have an ATF signal of four patterns Pa, Pb, Pc and Pd which repeatedly appear in a sequence of Pa, Pb, Pc and Pd.

Although, in the illustrated embodiments, the ATF signal of four patterns are adapted to be added at the respective signal processing circuits, this is never limited thereto. For example, predetermined ATF patterns may be written at the RAMs disposed at a rear stage of the signal processing circuits and added when the data is read out from the RAMs.

In case that such a modification is applied to the embodiment of FIG. 1, for example, the respective track rows - - - - - $TA_n$, $TB_n$ - - - - - of the signal-processed data output from the signal processing circuits 12 and 13 are supposed to include no ATF signal which should be added to the front and rear portions of the track data rows.

The RAMs 6 and 8 preliminarily store two patterns Pa and Pb among the four patterns of the ATF signal while the RAMs 7 and 9 preliminarily store the remaining patterns Pc and Pd.

Describing the operation of the RAMs during a period from time $t_6$ to time $t_{10}$, the RAM 6 outputs the pattern Pa of the ATF signal successively when it outputs the track data row $TA_n$ including no ATF signal while it outputs the pattern Pb of the ATF signal successively when it outputs the track data row $TB_n$. The RAM 7 outputs the pattern Pc of the ATF signal successively when it outputs the track data row $TA_{n+1}$ while it outputs the pattern Pd of the ATF signal successively when it outputs the track data row $TB_{n+1}$. Similarly, the RAM 8 outputs the patterns Pa and Pb of the ATF signal successively when it outputs the track data rows $TA_{n+2}$ and $TB_{n+2}$, respectively while the RAM 9 outputs the patterns Pc and Pd successively when it outputs the track data rows $TA_{n+3}$ and $TB_{n+3}$, respectively.

Thus, it will be noted that the ATF signal of four patterns periodically appearing is added to the respective track data rows of the RF-REC signal $S_{23}$ output from the output terminal 14.

Another method of adding the ATF signal to the track data rows will be described with reference to FIG. 1.

According to this method, the ATF signal is added not by any of the signal processing circuits and the RAMs 6 through 9, but by ATF signal occurrence means 31 shown by a dotted line.

Thus, the respective track data rows - - - - - $TA_n$, $TB_n$, $TA_{n+1}$, $TB_{n+1}$ - - - - - of the RF-REC signal $S_{29}$ output from the RAMs 6 through 9 include no ATF signal. The ATF signal occurrence means 31 inputs a timing signal $S_{39}$ synchronizing with these output timings from the RAM controller 11 and there is added an ATF signal $S_{40}$ of periodically appearing four patterns at an ATF area positioned at a front portion and a rear portion of the respective track data rows based on the timing signal $S_{39}$.

What is indicated by a reference number 32 and by a dotted line is add means formed by OR circuits to compose the RF-REC signal $S_{29}$ and the ATF signal $S_{40}$.

Although, in the illustrated embodiments, the respective signal processing circuits are adapted to signal-process the successive D data of one frame unit, they may be adapted to signal-process the successive D data of two frame unit by doubling the capacity of the respective RAMs. In this case, even though the respective track data rows output from the respective signal processing circuits are adapted to include the ATF signal, it is required that four patterns sequentially appear.

In the embodiment of FIG. 4, the RAMs 15 through 26 can be divided into four memory groups in the same manner as defined in the embodiment of FIG. 1. Thus, a first memory group includes the RAMs 15, 16 and 17, a second memory group the RAMs 18, 19 and 20, a third memory group the RAMs 21, 22 and 23 and a fourth memory group the RAMs 24, 25 and 26. It will be understood that the four memory groups for FIG. 4 correspond to those of FIG. 1 and that the number of the RAMs of each of the memory groups is equal to that of the signal processing circuits.

It will be noted that this invention enables the transmission rate of the D data to be higher without a y change in a processing velocity of signal processing circuits by increasing the number of the signal processing circuits making an interleave, addition of error correction codes and 8-10 modulation. This enables a digital signal recording and reproducing apparatus to make a higher speed dubbing.

It will be further noted that a construction of circuits can be simplified because control signals for RAMs such as AD signals can be common to a plurality of RAMs.

Although some embodiments of the invention have been illustrated and described with reference to the accompanying drawings, it will be understood by those skilled in the art that they are by way of examples, and that various changes and modifications may be made without departing from the spirit and scope of the invention, which is intended to be defined by the appended claims.

What is claimed is:

1. A digital signal processing circuit comprising:

first and second memory groups each including first through $n_{th}$ memory means to sequentially store digital data of transmission rate t input by a frame unit;

first control means to control said first and second memory groups so that said first through $n_{th}$ memory means in one of said first and second memory groups simultaneously output the stored digital data at transmission rate t/n while said first through $n_{th}$ memory means in the other of said first and second memory groups store said sequential digital data;

first through $n_{th}$ signal processing means to sequentially signal-process digital data of n systems alternately output from said first and second memory groups on a format of DAT, respectively;

third and fourth memory groups each including first through $n_{th}$ memory means to alternately store the data signal-processed by said signal processing means, respectively;

and second control means to control said third and fourth memory groups so that said first through $n_{th}$ memory means in one of said third and fourth memory groups output the stored digital data signal processed by said signal processing means at a velocity n times as great as that on memory in a predetermined sequential manner while said first through $n_{th}$ memory means in the other of said third and fourth memory groups store the data signal processed by said signal processing means output from said first through $n_{th}$ signal processing means.

2. A digital signal processing circuit as set forth in claim 1, and wherein said signal processing means have a function to apply an ATF signal to said signal-processed data.

3. A digital signal processing circuit as set forth in claim 1, and wherein said memory means of said third and fourth memory groups have ATF patterns previously written output to said signal-processed data when it is output from said memory means.

4. A digital signal processing circuit as set forth in claim 1, and further comprising ATF signal occurrence means to apply an ATF signal to said signal-processed data when it is output from an output terminal of said digital signal processing circuit.

* * * * *